Oct. 6, 1964   A. COX ETAL   3,152,211
WIDE ANGLE LENS ATTACHMENT
Filed May 1, 1961   2 Sheets-Sheet 1

Inventors
Arthur Cox
Walter J. Johnson
By Robert F. Miehle
Atty.

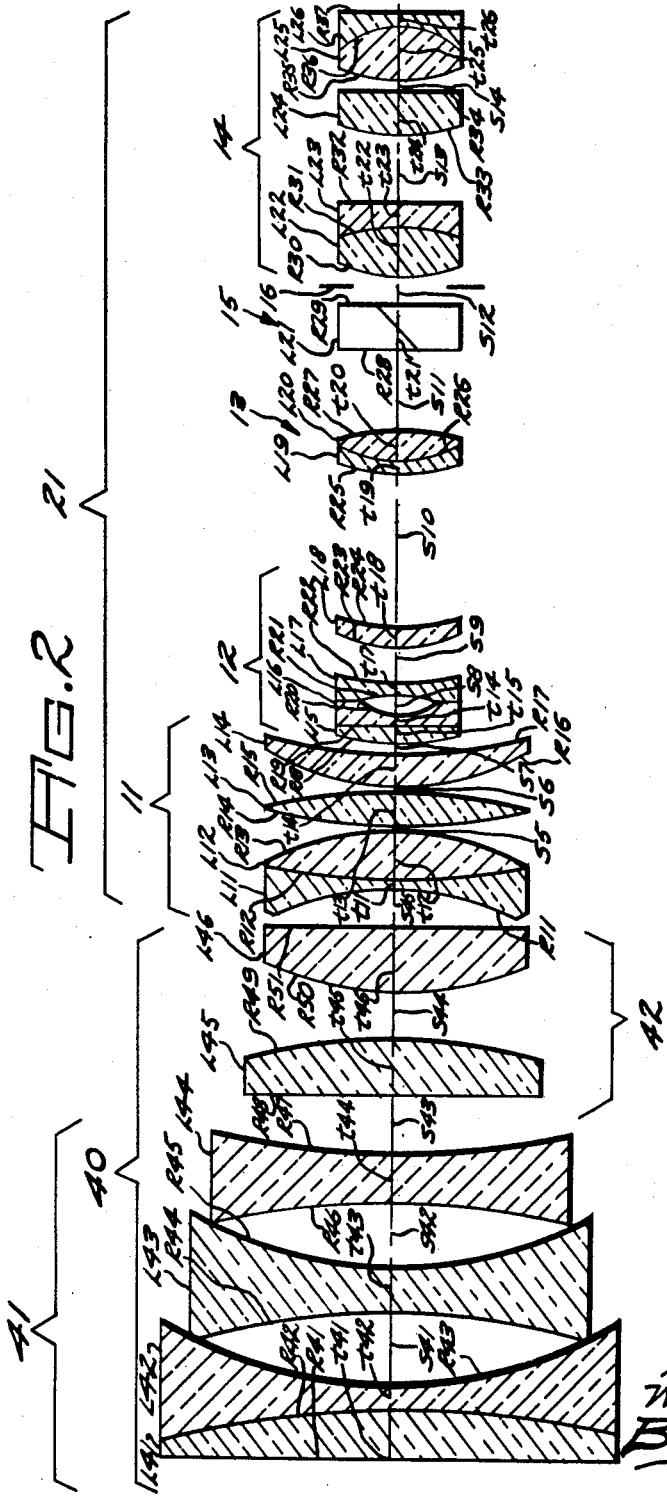

United States Patent Office 3,152,211
Patented Oct. 6, 1964

3,152,211
WIDE ANGLE LENS ATTACHMENT
Arthur Cox, Park Ridge, and Walter J. Johnson, Mundelein, Ill., assignors to Bell & Howell Company, Chicago, Ill., a corporation of Illinois
Filed May 1, 1961, Ser. No. 106,908
2 Claims. (Cl. 88—57)

This invention relates to a wide angle attachment for a zoom lens, and more particularly to a wide angle attachment for use with a zoom lens and corrected over the entire range of adjustment of the zoom lens.

An object of the invention is to provide an afocal wide angle attachment for a zoom lens to increase the magnification range of the zoom lens.

Another object of the invention is to provide a wide angle attachment for use with a zoom lens having a stop and highly corrected for the apparent shifting of the stop when the zoom lens is adjusted.

Another object of the invention is to provide a wide angle attachment having a front negative group including a negative meniscus front component and a negative second component along with a rear positive component.

It is to be understood that the terms "front" and "rear" as herein used refer to the left and right ends of the attachments respectively and to the ends of the objectives respectively nearer the longer and shorter conjugates thereof.

A complete understanding of the invention may be obtained from the following detailed description of wide angle attachments and zoom objectives forming specific embodiments thereof, when read in conjunction with the appended drawings, in which:

FIG. 2 is a longitudinal section of a wide angle attachment and the zoom lens of FIG. 1 which together form an alternate embodiment of the invention.

Figure 1:
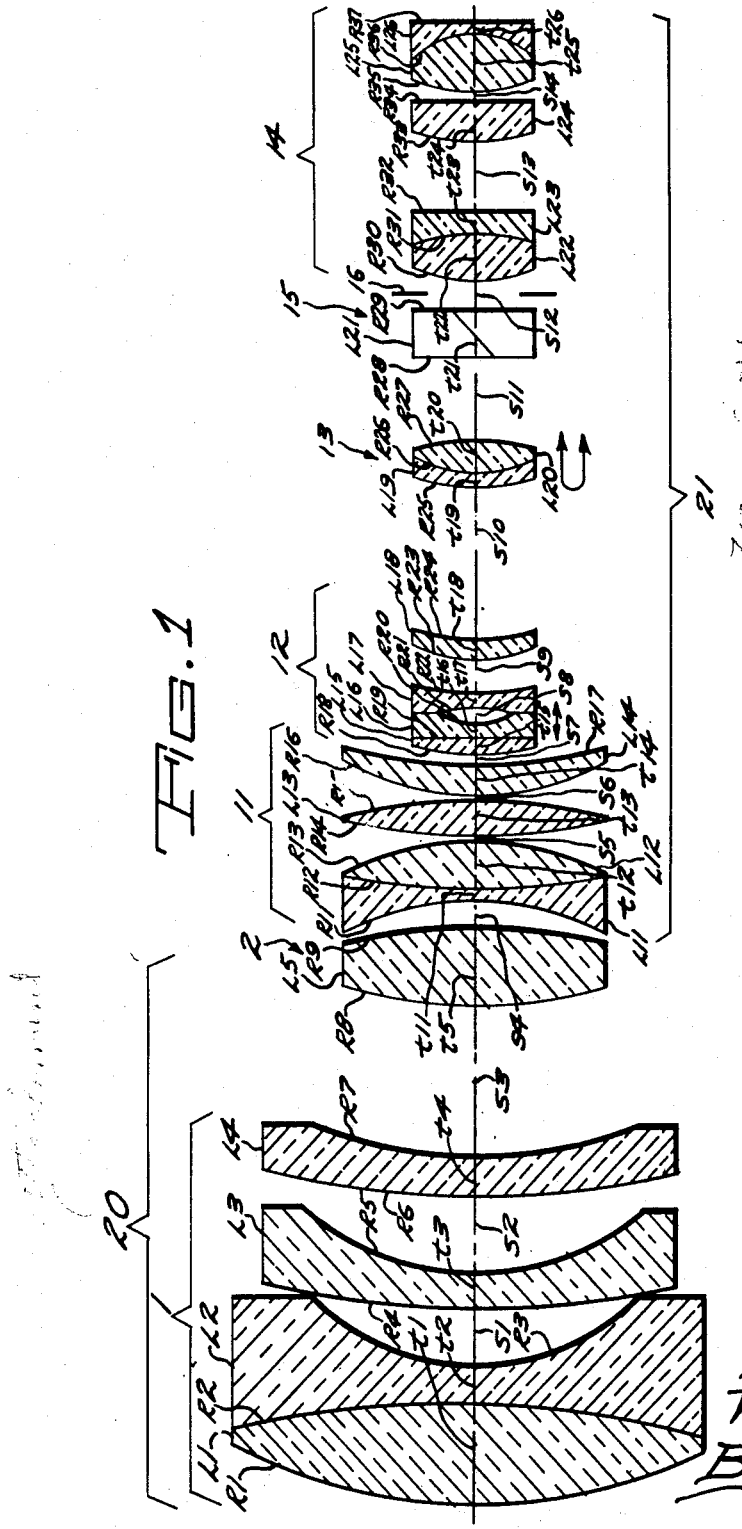
FIG. 1 is a longitudinal section of a wide angle attachment and a zoom lens which together form one embodiment thereof.

The invention provides afocal wide angle attachments for zoom lenses in some of which the attachments are corrected over ranges of adjustment of the zoom lenses. Each of the attachments includes a negative front lens group and a positive rear group or member. The front lens group comprises an achromatized negative meniscus front component and one or more negative lenses positioned therebehind. The rear group or member comprises one or more positive members. The attachments are highly corrected for use with zoom lenses in which the apparent positions of stops therein shift during zooming.

Referring now in detail to the drawings, there is shown in FIG. 1 a highly corrected afocal wide angle attachment 20 adapted for use with a zoom lens 21 when the lens 21 is in its extreme wide angle position. The lens 21 may be a zoom lens of the type shown in co-pending application Serial No. 786,309, for "Variable Focal Length Optical Objective," now Patent No. 3,038,378, filed January 12, 1959, and assigned to the same assignee as the instant application. The attachment 20 comprises a negative front lens group or member 1 and a positive rear member 2. The front group has an achromatic, negative meniscus front component consisting of lenses $L_1$ and $L_2$ and closely spaced negative meniscus second and rear singlet components $L_3$ and $L_4$, all of these components being concave to the rear. The positive member 2 consists of a biconvex singlet $L_5$ spaced substantially from the front lens group. The lenses $L_1$ to $L_5$ have spherical optical surfaces or radii of curvature $R_1$ to $R_9$, axial thicknesses $t_1$ to $t_5$ and axial separations $s_1$ to $s_3$.

The attachment 20 is designed to be mounted in front of the zoom lens or objective 21 with an axial separation $s_4$, and the zoom objective 21 includes a front lens group 11 adjustable for focusing, a linearly movable lens group 12, a non-linearly movable member 13 and a positive rear lens group 14, a beam splitter 15 and a stop or diaphragm 16 being positioned between the member 13 and lens group 14. The zoom lens 21 includes lenses $L_{11}$ to $L_{26}$ having spherical optical surfaces of radii of curvature $R_{11}$ to $R_{37}$, axial thicknesses $t_{11}$ to $t_{26}$ and axial separations $s_5$ to $s_{14}$. During zooming the lens groups 11 and 14 and beam splitter 14 and stop 15 are fixed relative to the focal plane which is positioned to the rear of the lens group 14, the group 12 is moved linearly in one direction and the lens member 13 is moved non-linearly. The lens 21 is shown in its extreme wide angle adjustment, for which position the attachment 20 is highly corrected and substantially doubles the field covered.

The attachment 20 has a large aperture and a wide angle of coverage of about 61°, is highly corrected and has a negative magnification of about 1.9. Each of the front group of components $L_1$-$L_2$, $L_3$ and $L_4$ is negative and is concave rearwardly, and with the stop 16 positioned a distance of about 1.48 $s_3$ to the rear of the surface $R_9$, distortion is at a minimum, less than three-quarters of one percent. There are no apparent higher order aberrations introduced by the attachment 20, and the angle of coverage could be increased considerably. In one form of the attachment 20 the equivalent focal length of the group 1 is —1.354 inches, that of the member 2 is +2.572 inches, that of the components $L_1$-$L_2$ is —5.926 inches, that of the lens $L_3$ is —2.851 inches and that of the component $L_4$ is —5.939 inches.

A preferred embodiment of the attachment 20 is constructed in conformity with the following table in which dimensions are in terms of inches, and the indices of refraction for the sodium D line and the Abbe dispersion numbers are respectively designated at $n_d$ and V:

| | | | | |
|---|---|---|---|---|
| $L_1$ | $R_1=+4.419$ | $t_1=.530$ | $n_d=1.720$ | V=29.3 |
| | $R_2=-10.000$ | $t_2=.200$ | $n_d=1.523$ | V=58.6 |
| $L_2$ | $R_3=+1.379$ | $s_1=.310$ | | |
| | $R_4=+9.189$ | | | |
| $L_3$ | $R_5=+1.527$ | $t_3=.200$ | $n_d=1.649$ | V=33.8 |
| | $R_6=+5.031$ | $s_2=.360$ | | |
| $L_4$ | $R_7=+2.273$ | $t_4=.200$ | $n_d=1.720$ | V=29.3 |
| | $R_8=+2.548$ | $s_3=.8225$ | | |
| $L_5$ | $R_9=-4.001$ | $t_5=.400$ | $n_d=1.620$ | V=60.3 |
| | | $s_4=.100$ | | |

The zoom lens may be constructed in accordance with the following table, in which dimensions are in terms of inches, and the indices of refraction for the sodium D line and the Abbe dispersion numbers are respectively designated at $n_d$ and V:

[Equivalent focal length 2.967, 1.479, .741 (Fig. 1). Back focal length .6493. Aperture f/1.9]

| | | | | |
|---|---|---|---|---|
| $L_{11}$ | $R_{11}=-2.960$ | $t_{11}=.150$ | $n_d=1.720$ | $V=29.3$ |
| $L_{12}$ | $R_{12}=+15.3893$ | $t_{12}=.420$ | $n_d=1.620$ | $V=60.3$ |
| | $R_{13}=-3.3485$ | $s_5=.014$ | | |
| $L_{13}$ | $R_{14}=+5.2225$ | $t_{13}=.320$ | $n_d=1.700$ | $V=47.8$ |
| | $R_{15}=-20.008$ | $s_6=.014$ | | |
| $L_{14}$ | $R_{16}=+2.400$ | $t_{14}=.320$ | $n_d=1.620$ | $V=60.3$ |
| | $R_{17}=+5.2225$ | $s_7 \begin{cases}=1.6791\\=1.1394\\=.0670 \text{ (Fig. 1)}\end{cases}$ | | |
| $L_{15}$ | $R_{18}=+1.925$ | $t_{15}=.200$ | $n_d=1.751$ | $V=27.7$ |
| $L_{16}$ | $R_{19}=$ Plano | $t_{16}=.080$ | $n_d=1.617$ | $V=55.0$ |
| | $R_{20}=+.5720$ | $s_8=.160$ | | |
| $L_{17}$ | $R_{21}=-2.280$ | $t_{17}=$ | $n_d=1.700$ | $V=41.1$ |
| | $R_{22}=+1.336$ | $s_9=.400$ | | |
| $L_{18}$ | $R_{23}=+1.477$ | $t_{18}=.160$ | $n_d=1.720$ | $V=29.3$ |
| | $R_{24}=+2.960$ | $s_{10}\begin{cases}=.1349\\=.8990\\=1.2783 \text{ (Fig. 1)}\end{cases}$ | | |
| $L_{19}$ | $R_{25}=+3.025$ | $t_{19}=.100$ | $n_d=1.700$ | $V=47.8$ |
| $L_{20}$ | $R_{26}=+1.336$ | $t_{20}=.250$ | $n_d=1.517$ | $V=64.5$ |
| | $R_{27}=-2.500$ | $s_{11}\begin{cases}=.3319\\=.1075\\=.8007 \text{ (Fig. 1)}\end{cases}$ | | |
| $L_{21}$ | $R_{28}=$ Plano | $t_{21}=.400$ | $n_d 1.620=$ | $V=60.3$ |
| | $R_{29}=$ Plano | $s_{12}=.100$ | | |
| $L_{22}$ | $R_{30}=+1.707$ | $t_{22}=.300$ | $n_d=1.580$ | $V=41.0$ |
| | $R_{31}=-1.500$ | | | |
| $L_{23}$ | $R_{32}=+13.361$ | $t_{23}=.150$ | $n_d=1.751$ | $V=27.7$ |
| | $R_{33}=+3.489$ | $s_{13}=.700$ | | |
| $L_{24}$ | $R_{34}=-4.001$ | $t_{24}=.200$ | $n_d=1.620$ | $V=60.3$ |
| | $R_{35}=+1.422$ | $s_{14}=.300$ | | |
| $L_{25}$ | $R_{36}=-.890$ | $t_{25}=.460$ | $n_d=1.620$ | $V=60.3$ |
| $L_{26}$ | $R_{37}=+4.170$ | $t_{26}=.120$ | $n_d=1.751$ | $V=27.7$ |

A focal wide angle attachment 40 (FIG. 2) is very highly corrected for zooming of the zoom lens 21 through the wide angle half of its zooming range. The attachment 40 includes a front negative group 41 and a rear positive group 42. The negative group includes a negative cemented compound meniscus component $L_{41}$–$L_{42}$ and biconcave singlet components $L_{43}$ and $L_{44}$. The group 42 includes front positive singlet component $L_{45}$ predominantly convex rearwardly and rear positive singlet component $L_{46}$ predominantly convex forwardly. The attachment 40 has radii of curvature $R_{41}$ to $R_{51}$ of spherical optical surfaces, axial thicknesses $t_{41}$ to $t_{46}$, axial separations $s_{41}$ to $s_{44}$ from the zoom lens 21. The attachment 40 provides a negative magnification of 1.9 and is highly corrected for all positions or conditions of adjustment of the zoom lens 21 from the extreme wide angle adjustment thereof to about the midposition between the wide angle and telephoto positions.

A preferred embodiment of the attachment 40 is constructed substantially in accordance with the following table in which dimensions are in terms of inches, and the indices of refraction for the sodium D line and the Abbe dispersion numbers are respectively designated at $n_d$ and V:

| | | | | |
|---|---|---|---|---|
| $L_{41}$ | $R_{41}=$ Plano | $t_{41}=.250$ | $n_d=1.720$ | $V=29.3$ |
| $L_{42}$ | $R_{42}=-2.000$ | $t_{42}=.090$ | $n_d=1.523$ | $V=58.6$ |
| | $R_{43}=+.741$ | $s_{41}=.180$ | | |
| $L_{43}$ | $R_{44}=-40.000$ | $t_{43}=.090$ | $n_d=1.720$ | $V=29.3$ |
| | $R_{45}=+1.209$ | $s_{42}=.143$ | | |
| $L_{44}$ | $R_{46}=-2.857$ | $t_{44}=.090$ | $n_d=1.720$ | $V=29.3$ |
| | $R_{47}=+3.441$ | $s_{43}=.343$ | | |
| $L_{45}$ | $R_{48}=$ Plano | $t_{45}=.200$ | $n_d=1.620$ | $V=60.3$ |
| | $R_{49}=-2.545$ | $s_{44}=.020$ | | |
| $L_{46}$ | $R_{50}=+2.128$ | $t_{46}=.200$ | $n_d=1.620$ | $V=60.3$ |
| | $R_{51}=-2.861$ | $s_{45}=.100$ | | |

The attachments 20 and 40 for high correction should conform with the following inequality:

$$.13 < \frac{\text{Power of front negative doublet}}{\text{Power of entire negative group}} < .25$$

Also the lens $L_5$ should conform to the following inequality:

$$.48 < \frac{\text{Power of } R_8}{\text{Power of lens } L_5} < .65$$

The lenses' components 42 should comply with the following inequality:

$$0 < \frac{\text{Power of } R_{48}}{\text{Power of component 42}} < .30$$

While the invention is thus described, it is not wished to be limited to the precise details described, as changes may be readily made without departing from the spirit of the invention.

What is claimed is:

1. In a wide angle attachment, proceeding from front to rear, a negative meniscus cemented doublet front component, a negative meniscus singlet second component convex to the front, a negative meniscus singlet third component convex to the front, and a biconvex singlet rear component, and being further characterized in that the objective conforms substantially to the following table in which dimensions are in terms of inches, and proceeding from front to rear $L_1$ to $L_5$ designate the lenses, $R_1$ to $R_9$ the radii of curvature of the surfaces, $t_1$ to $t_5$ the axial thicknesses, $s_1$ to $s_3$ the axial separations, $n_d$ the indices of refraction for the sodium D line and V the Abbe dispersion numbers:

| | | | | |
|---|---|---|---|---|
| $L_1$ | $R_1 = +4.419$ | $t_1 = .530$ | $n_d = 1.720$ | $V = 29.3$ |
| | $R_2 = -10.000$ | | | |
| $L_2$ | $R_3 = +1.379$ | $t_2 = .200$ | $n_d = 1.523$ | $V = 58.6$ |
| | $R_4 = +9.189$ | $s_1 = .310$ | | |
| $L_3$ | $R_5 = +1.527$ | $t_3 = .200$ | $n_d = 1.649$ | $V = 33.8$ |
| | $R_6 = +5.031$ | $s_2 = .360$ | | |
| $L_4$ | $R_7 = +2.273$ | $t_4 = .200$ | $n_d = 1.720$ | $V = 29.3$ |
| | $R_8 = +2.548$ | $s_3 = .8225$ | | |
| $L_5$ | $R_9 = -4.001$ | $t_5 = .400$ | $n_d = 1.620$ | $V = 60.3$ |

2. In a wide angle attachment, proceeding from front to rear, a negative meniscus cemented doublet front component, a biconcave singlet second component, a biconcave singlet third component, a positive singlet fourth component predominantly convex rearwardly, and a positive rear component predominantly convex forwardly, and being further characterized in that the objective conforms substantially to the following table in which dimensions are in terms of inches, and proceeding from front to rear $L_{41}$ to $L_{46}$ designate the lenses, $R_{41}$ to $R_{51}$ the radii of curvature of the surfaces, $t_{41}$ to $t_{46}$ the axial thicknesses, $s_{41}$ to $s_{44}$ the axial separations, $n_d$ the indices of refraction for the sodium D line and V the Abbe dispersion numbers:

| | | | | |
|---|---|---|---|---|
| $L_{41}$ | $R_{41} = $ Plano | $t_{41} = .250$ | $n_d = 1.720$ | $V = 29.3$ |
| | $R_{42} = -2.000$ | | | |
| $L_{42}$ | $R_{43} = +.741$ | $t_{42} = .090$ | $n_d = 1.523$ | $V = 58.6$ |
| | $R_{44} = -40.000$ | $s_{41} = .180$ | | |
| $L_{43}$ | $R_{45} = +1.209$ | $t_{43} = .090$ | $n_d = 1.720$ | $V = 29.3$ |
| | $R_{46} = -2.857$ | $s_{42} = .143$ | | |
| $L_{44}$ | $R_{47} = +3.441$ | $t_{44} = .090$ | $n_d = 1.720$ | $V = 29.3$ |
| | $R_{48} = $ Plano | $s_{43} = .343$ | | |
| $L_{45}$ | $R_{49} = -2.545$ | $t_{45} = .200$ | $n_d = 1.620$ | $V = 60.3$ |
| | $R_{50} = +2.128$ | $s_{44} = .020$ | | |
| $L_{46}$ | $R_{51} = -2.861$ | $t_{46} = .200$ | $n_d = 1.620$ | $V = 60.3$ |
| | | $s_{45} = .100$ | | |

References Cited in the file of this patent
UNITED STATES PATENTS 2,548,569     Tolle _____ Apr. 10, 1951
2,789,463     Kohler et al. _____ Apr. 23, 1957